(12) United States Patent
Nasser

(10) Patent No.: US 10,218,637 B2
(45) Date of Patent: Feb. 26, 2019

(54) SYSTEM AND METHOD FOR FORECASTING AND EXPANDING SOFTWARE WORKLOAD BOUNDARIES

(71) Applicant: International Business Machines Corporation, Armonk, NY (US)

(72) Inventor: Samir A. Nasser, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 15/342,621

(22) Filed: Nov. 3, 2016

(65) Prior Publication Data

US 2018/0123973 A1    May 3, 2018

(51) Int. Cl.
| | |
|---|---|
| *H04L 12/26* | (2006.01) |
| *G06F 9/48* | (2006.01) |
| *H04L 12/927* | (2013.01) |
| *H04L 12/919* | (2013.01) |
| *G06F 9/50* | (2006.01) |

(52) U.S. Cl.
CPC .............. *H04L 47/805* (2013.01); *G06F 9/50* (2013.01); *H04L 47/765* (2013.01); *H04L 47/803* (2013.01)

(58) Field of Classification Search
None
See application file for complete search history.

(56) References Cited

U.S. PATENT DOCUMENTS

| | | | |
|---|---|---|---|
| 8,407,414 B2 | 3/2013 | Takeda et al. | |
| 8,909,890 B2 | 12/2014 | Gill et al. | |
| 2009/0248189 A1* | 10/2009 | Schmidt | G05B 17/02 700/109 |
| 2014/0105019 A1* | 4/2014 | Harrang | H04L 47/22 370/235 |
| 2014/0379922 A1* | 12/2014 | Xiao | H04L 47/70 709/226 |
| 2014/0380330 A1* | 12/2014 | Xiao | G06F 9/5083 718/104 |
| 2017/0127387 A1* | 5/2017 | Breuer | H04W 36/26 |
| 2018/0240163 A1* | 8/2018 | Sivasubramanian | G06Q 30/0283 |

* cited by examiner

*Primary Examiner* — Natisha D Cox
(74) *Attorney, Agent, or Firm* — George R. McGuire; Bond Schoeneck & King, PLLC; John Pivnichny

(57) ABSTRACT

The present invention is a system and method for forecasting and expanding software workload boundaries. The system includes a computer processor having a non-transitory memory containing program code for receiving a resource tree data set identifying a plurality of resources in a resource tree; receiving a sequence information set indicative of an order of resources for a request type; receiving a historical usage information set indicative of actual resource usage for the request type with respect resources in the resource tree; receiving a current throughput value for the request type; and determining, based at least in part upon the resource data tree set, the sequence information set and the current throughput values, a first additional potential throughput value corresponding to additional throughput with respect to the request type that can be performed by the resource tree in addition to its current throughput.

20 Claims, 8 Drawing Sheets

SYSTEM AND METHOD FOR FORECASTING AND EXPANDING SOFTWARE WORKLOAD BOUNDARIES

BACKGROUND

The present invention relates generally to determination of "software workload boundaries," that is, maximum limits on quantity and/or quality of computing tasks caused by limits on computing resources in a computing system.

Conventional information technology monitoring tools determine when a given workload extends beyond a threshold. For example, the monitoring tool will provide an alert when a given workload mix shows a resource usage beyond a safe level. Other information technology monitoring tools will also determine which resource is being utilized beyond a safe level. Some monitoring tools also indicate which resource should be modified to bring the resource usage level down to a safe level.

SUMMARY

The present invention is a system and method for forecasting and expanding software workload boundaries. The system includes a computer processor having a non-transitory memory containing program code for: (i) receiving a resource tree data set that includes machine readable data identifying a plurality of resources in a resource tree, (ii) for each request type of the plurality of request types, receiving a sequence information set that includes machine readable data indicative of an order of resources of the resource tree used for the respectively corresponding request type; (iii) for each request type of a plurality of request types including a first request type, receiving a historical usage information set that includes machine readable data indicative of actual resource usage for the respectively corresponding request type with respect to the plurality of resources in the resource tree; (iv) for each request type of the plurality of request types, receiving a current throughput value for the respectively corresponding request type; and (v) determining, based at least in part upon the resource data tree set, the sequence information set and the current throughput values, a first additional potential throughput value corresponding to additional throughput with respect to requests of the first request type that can be performed by the resource tree in addition to its current throughput.

The method for forecasting and expanding software workload boundaries, includes the steps of: (i) receiving a resource tree data set that includes machine readable data identifying a plurality of resources in a resource tree; (ii) for each request type of the plurality of request types, receiving a sequence information set that includes machine readable data indicative of an order of resources of the resource tree used for the respectively corresponding request type; (iii) for each request type of a plurality of request types including a first request type, receiving a historical usage information set that includes machine readable data indicative of actual resource usage for the respectively corresponding request type with respect to the plurality of resources in the resource tree; (iv) for each request type of the plurality of request types, receiving a current throughput value for the respectively corresponding request type; and (v) determining, based at least in part upon the resource data tree set, the sequence information set and the current throughput values, a first additional potential throughput value corresponding to additional throughput with respect to requests of the first request type that can be performed by the resource tree in addition to its current throughput.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
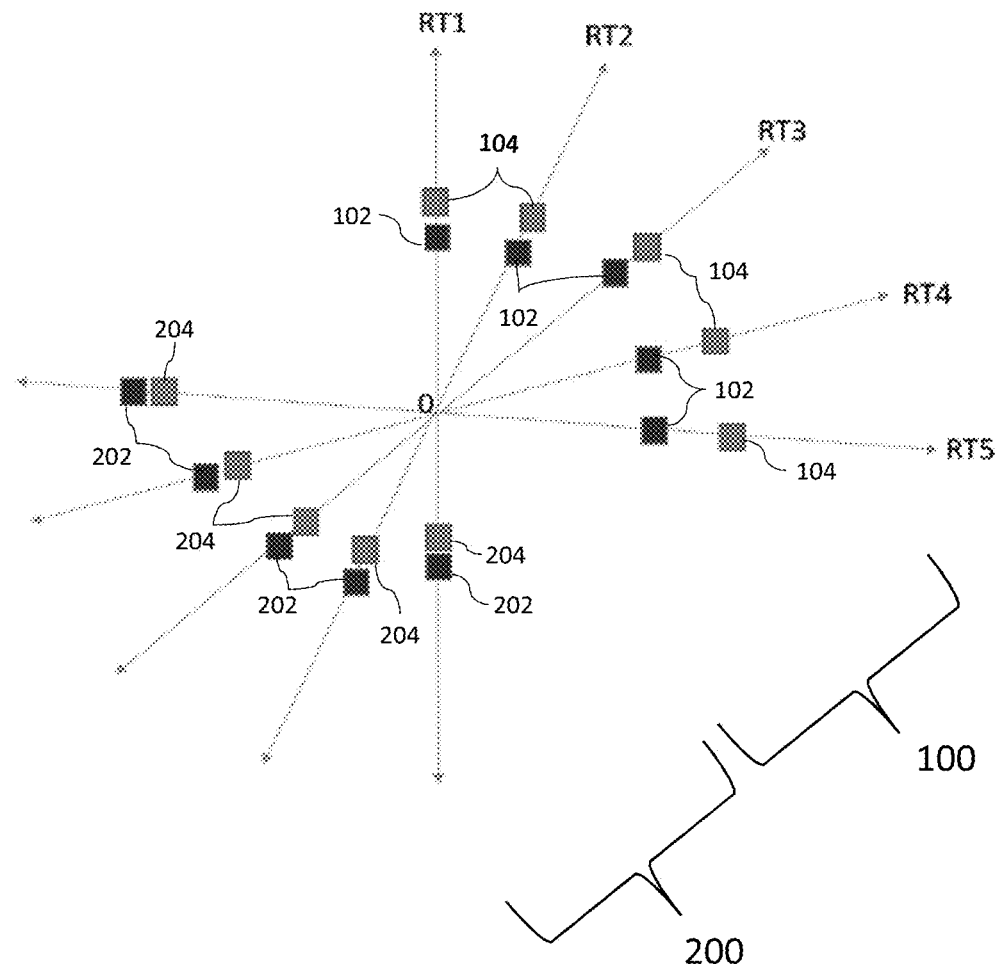
FIG. 1 is a conceptual diagram of a non-limiting illustrative embodiment of a system for forecasting and expanding software workload boundaries.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention recognize one or more of the following: (i) conventional monitoring tools cannot determine workload boundaries for a resource tree that spans across the multiple solution layers; (ii) there is a need in the art for a system that can identify specific changes required for specific resources to enable the environment to handle an increase in throughput of a specific request type; (iii) such a system is needed to accommodate the increased throughput without sacrificing the performance requirements for the other request types; (iv) there exists a need for a system and method for forecasting workload boundaries for requests types using resources spanning across multiple solution layers; and/or (v) there exists a need for a system and method for identifying and executing changes to resources to accommodate the additional workload.

Referring again to the drawings, wherein like reference numerals refer to like parts throughout, there is seen in FIG. 1 a conceptual diagram of a non-limiting illustrative embodiment of the system for forecasting and expanding software workload boundaries. In the depicted embodiment, there are five request types RT1, RT2, RT3, RT4 and RT5. In FIG. 1, each request type RT1 to RT5 is represented as a bi-directional arrow with four points 102, 104, 202, 204 marked on it. The four points respectively represent the following characteristics of their associated request type: (i) the distance between origin O and point 102 represents a minimum throughput value; (ii) the distance between origin O and point 104 represents an actual throughput measurement value; (iii) the distance between origin O and point 202 represents a maximum allowable response time value; and (iv) the distance between origin O and point 204 represents an actual response time measurement value.

Figure 2:
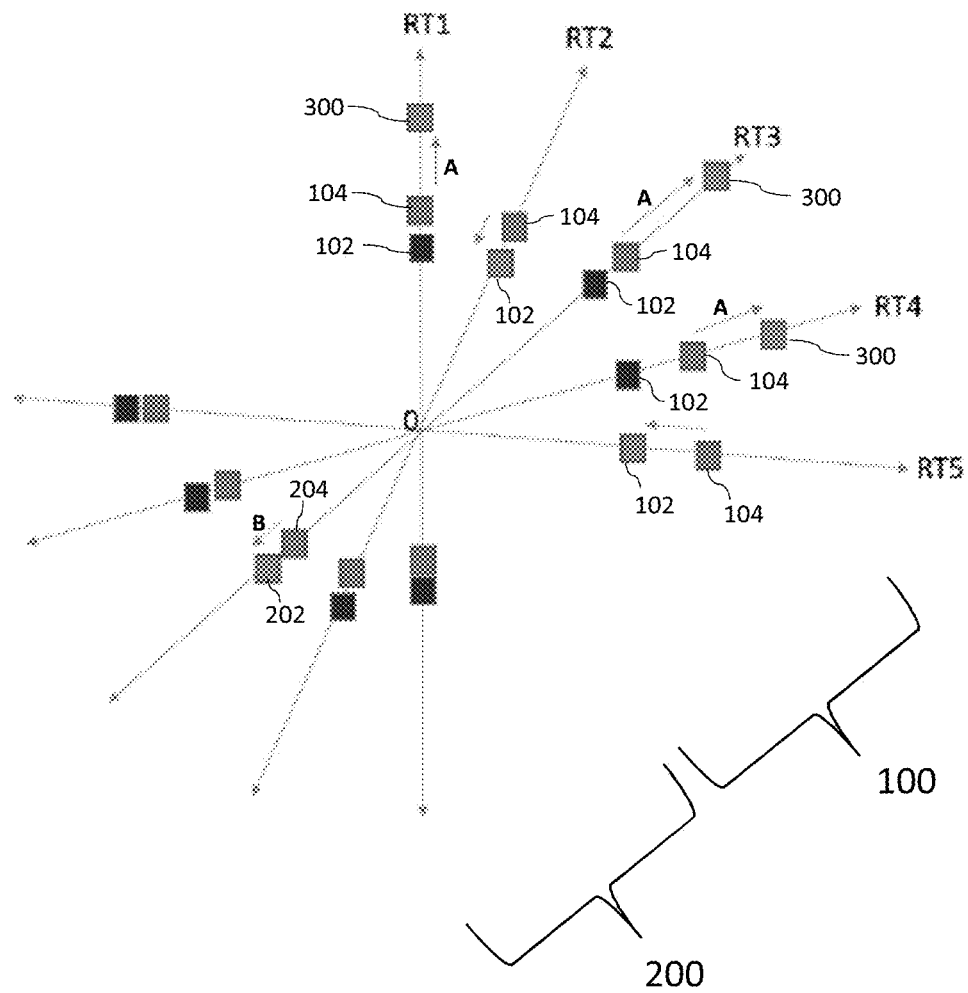
FIG. 2 is a conceptual diagram of a non-limiting illustrative embodiment of a workload boundary obtained when throughputs of various request types are increased.

The concept of a "workload boundary" will now be introduced. A workload boundary is: (i) a maximum throughput for a request type, obtainable through appropriate computing system accommodations (as will be discussed below) consistent with reliable operations of the computing system; or (ii) a minimum response time for a request type, obtainable through appropriate computing system accommodations, consistent with reliable operations of the computing system. Referring now to FIG. 2, there is shown a conceptual diagram of a non-limiting illustrative embodiment of a workload boundary obtained when throughputs of various request types are increased. In the depicted embodiment, the actual throughput values for request types RT1, RT3, and RT4 are increased as shown by arrows A in FIG. 2. As the actual throughput 104 of request types RT1, RT3, and RT4 increase, a workload boundary 300 is established. The workload boundary 300 represents the maximum throughput for request types RT1, RT3 and RT4. In this example, in order to (at least partially) accommodate the actual throughput values that increase to approach workload boundary 300, the actual throughput values 104 for request types RT2 and RT5 are decreased towards the required throughput 102. It is noted that this assumes that requests of all five request types will continue to be received, so that increased throughput required of some request types will be effectively offset by decreases in throughput required of the other request types.

Still referring to FIG. 2, there is shown an additional method for accommodating the increased workload boundary 300. For request type RT3, the actual response time value 204 is increased, as shown by arrow B, to the maximum required response time 202. To speak more generally, for a given request type, a response time increase can be used to (at least partially) accommodate a throughput increase.

Figure 3:
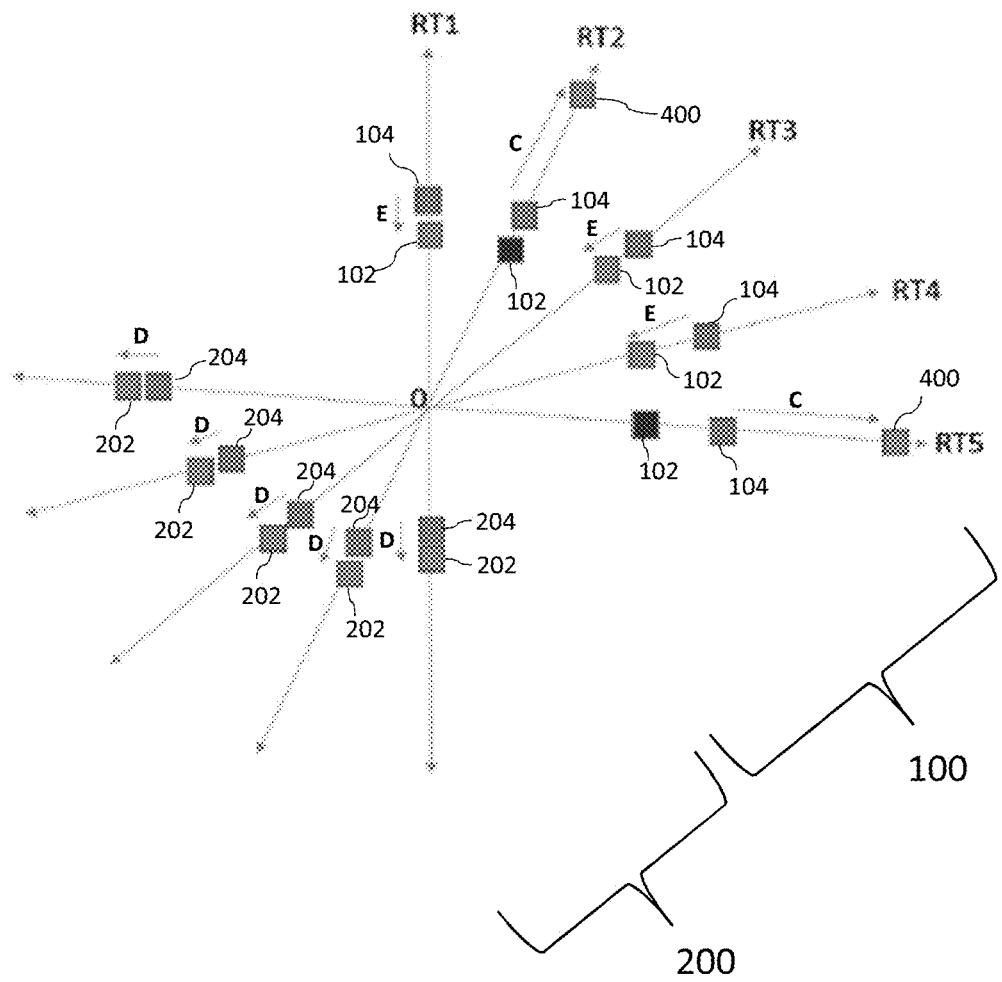
FIG. 3 is an additional conceptual diagram of a non-limiting illustrative embodiment of a workload boundary obtained when throughputs of various request types are increased.

Referring now to FIG. 3, there is shown an additional conceptual diagram of a non-limiting illustrative embodiment of a workload boundary obtained when throughputs of various request types are increased. In the exemplary embodiment shown in FIG. 3, the workload boundaries 400 for request types RT2 and RT5 are shown under conditions where the actual throughput values 104 of request types RT2 and RT5 are being increased, as shown by arrows C. Having increasing actual throughput values 104 corresponding to request types RT2 and RT5 drives down the actual throughput values 104 corresponding to request types RT1, RT3 and RT4 down towards their respective minimum throughput values 102, as shown by arrows E. Also shown in FIG. 3, the actual response times 204 for each request type RT1-5 is pushed towards its respective maximum allowable response time 202 as shown by arrows D in FIG. 3. This drives the CPU and memory toward their maximum performance limitations as well.

Figure 4:
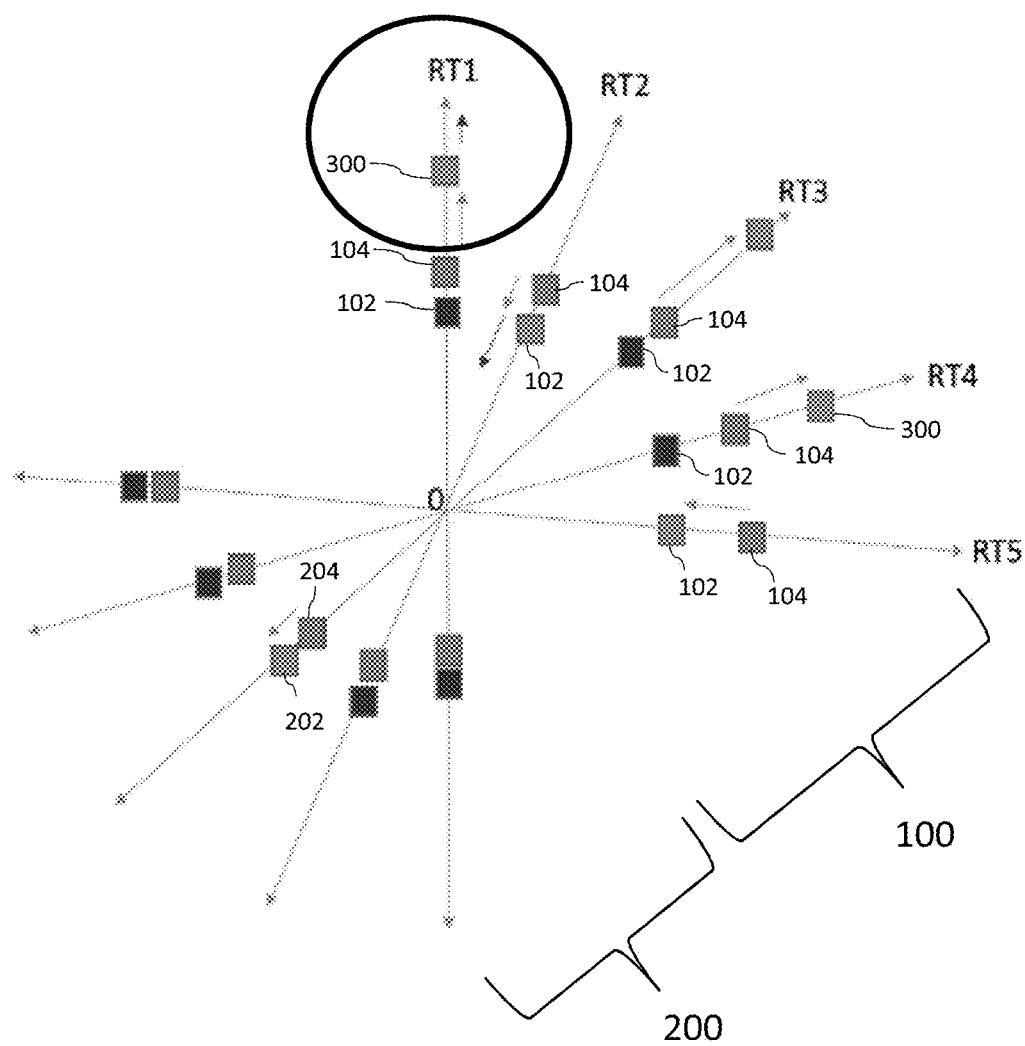
FIG. 4 is a conceptual diagram of a non-limiting illustrative embodiment of throughput and response time metrics when a workload boundary is exceeded.

Referring now to FIG. 4, there is shown a conceptual diagram of a non-limiting illustrative embodiment of the throughput and response time metrics of request types when a workload boundary exceeded. FIG. 4 shows the increased actual throughput 104 and corresponding workload boundaries 300 of the embodiment shown in FIG. 2. In both FIGS. 2 and 4, the actual throughput 104 is increased for request types RT1, RT3 and RT4; however, in the embodiment depicted in FIG. 4, the workload boundary 300 for request type RT1 is exceeded. As a result, the actual throughput 104 of request type RT2 is decreased below its minimum required throughput 102. In order to maintain the actual throughput 104 of request type RT2 at the minimum required throughput 102, additional changes to a number of resources can be made. For example, such changes can include increasing the web container thread pool, increasing the JDBC connection pool, increasing the heap size, adding 1 GB RAM and adding 2 CPUs.

However, if changes to the resources are not desired, the environment may still run the new workload mix without any changes. In this scenario, a priority order of request types determines which request type will operate at a degraded level. For example, as shown in FIG. 4, if the actual throughput 102 for request type RT1 exceeds the workload boundary 300, the priority order designates RT2 as the least important and sacrifices the performance requirement 102 of request type RT2. Thus, request type RT2 may perform at a 10% degradation level, for example, to allow the new workload mix to run without any changes to the environment.

Figure 5:
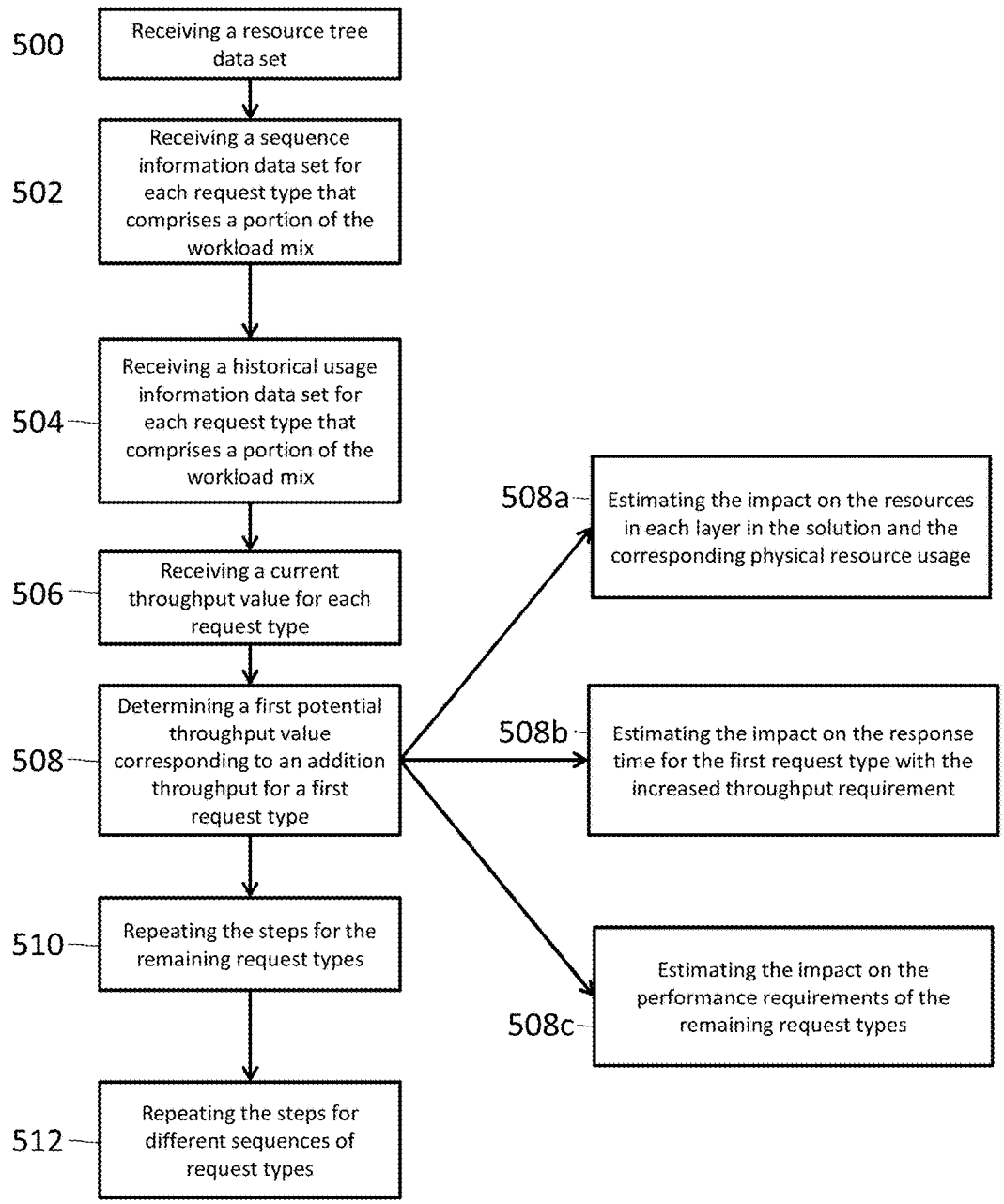
FIG. 5 is a flow chart of a non-limiting illustrative embodiment of a method for forecasting software workload boundaries.

Referring now to FIG. 5, there is shown a flowchart of a method for forecasting software workload boundaries according to a non-limiting illustrative embodiment. At the first step 500, the system receives a resource tree data set. The resource tree data set includes machine readable data identifying a plurality of resources in a resource tree. Examples of resources include the web container thread pool, database connection pool, central processing unit (CPU), and memory. Further, resources may be on different solution layers. Thus, the resource tree may span across multiple solution layers.

Figure 7:
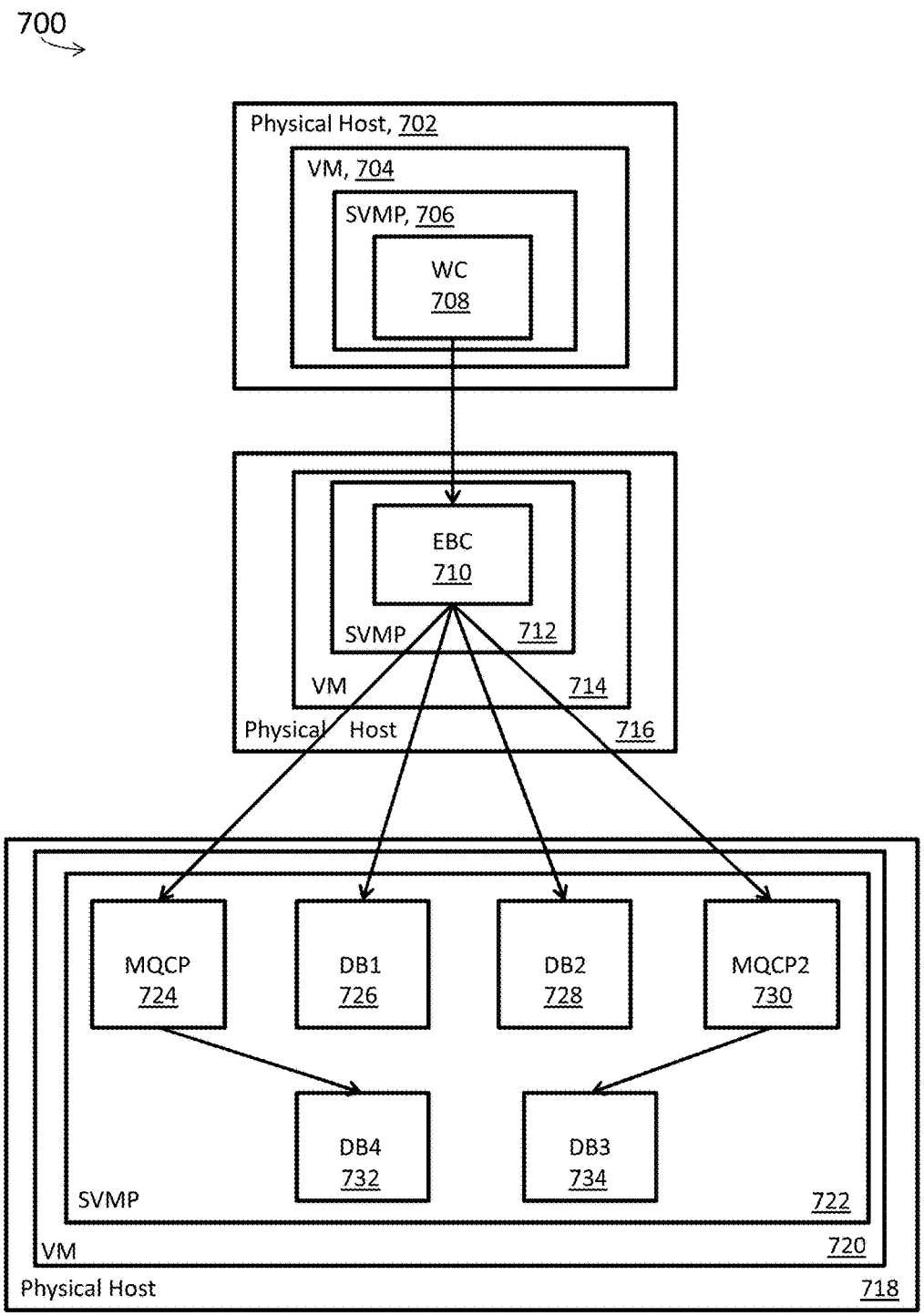
FIG. 7 is a diagram of a non-limiting illustrative embodiment of a resource tree spanning across multiple solution layers.

As shown in FIG. 7, resource tree 700 includes: physical host 702; virtual machine (VM) 704; secondary virtual machine platform 706 (secondary virtual machine platform may be, for example, a Java virtual machine); web container 708; physical host 716; virtual machine 714; secondary virtual machine platform (SVMP) 712; enterprise bean container 710 (note: a "bean" encapsulates many objects into a single object); physical host 718; virtual machine 720; secondary virtual machine platform 722; messaging queue 724; database 726; database 728; messaging queue 730; database 732; and database 734. Resource tree 700 includes four (4) solution layers as follows: (i) physical host layer (including physical hosts 702, 716, 718); (ii) VM layer (including VMs 704, 714, 720); (iii) SVMP layer (including SVMPs 706, 712, 722); and (iv) VM-object layer (including web container 708, enterprise bean container 710 and blocks 724, 726, 728, 730, 732, 734). Because resource tree 700 spans across multiple layers, a specific request for resources of resource tree 700 may utilize any number of resources across multiple layers. For example, a first request type may utilize: (i) the web container, (ii) a container that services such as transaction and resource management, versioning, scalability, mobility, persistence, and security to the software components it contains; and (iii) an MQ connection pool.

Returning to discussion of the flowchart of FIG. 5, at the next step 502, the system receives a sequence information data set for each request type that includes a portion of the workload mix. The sequence information set includes machine readable data indicative of an order of resources from the resource tree that are used for the respective corresponding request type. As stated in the example above, the first request type may utilize the web container, EJB container and MQ connection pool. However, all other resource sequences are contemplated.

At the subsequent step 504, the system receives a historical usage information data set respectively corresponding to each request type. Each historical usage information data set includes information indicating a proportion of the workload mix that corresponds to the corresponding request type. The historical usage information data set includes machine readable data indicative of the actual resource usage for the respectively corresponding request type. The historical usage information allows the system to track how much a given resource is utilized for each request type. As described later, the system uses the historical usage information to determine workload boundaries.

At the following step 506, the system receives a current throughput value for each request type.

At the next step 508, the system determines a first potential throughput value corresponding to an additional throughput for a first request type. More specifically, in this example, the system estimates the maximum increase in throughput for a first request type by estimating the impact of the additional throughput on three impact factors. With respect to the first factor, as shown at sub-step 508a, the system first estimates the impact on the resources in each layer in the solution and the corresponding physical resource usage. With respect to the second factor, at sub-step 508b, the impact on the response time is estimated for the first request type with the increased throughput requirement. The maximum throughput is reached when the response time begins to exceed the maximum acceptable response time. With respect to the third factor, at sub-step 508c, the impact on the performance requirements for the remaining request types are estimated. The maximum throughput is obtained when the performance requirements of any one of the remaining request types begins to degrade.

At the next step 510, the above listed steps are repeated for the remaining request types. Thus, the workload boundaries are determined for each request type. Further, at the next step 512, all the above listed steps are repeated for different sequences of request types. At this stage, the workload mix boundaries have been estimated and the environment can begin running the workload mix well within any workload mix boundary. With the workload mix boundaries determined, the system may easily determine if a specific request type, requiring an increase in throughput, will be within a workload mix boundary or exceed a workload mix boundary. If the specific request type does exceed a workload mix boundary, the system determines how to accommodate the additional throughput.

Figure 6:
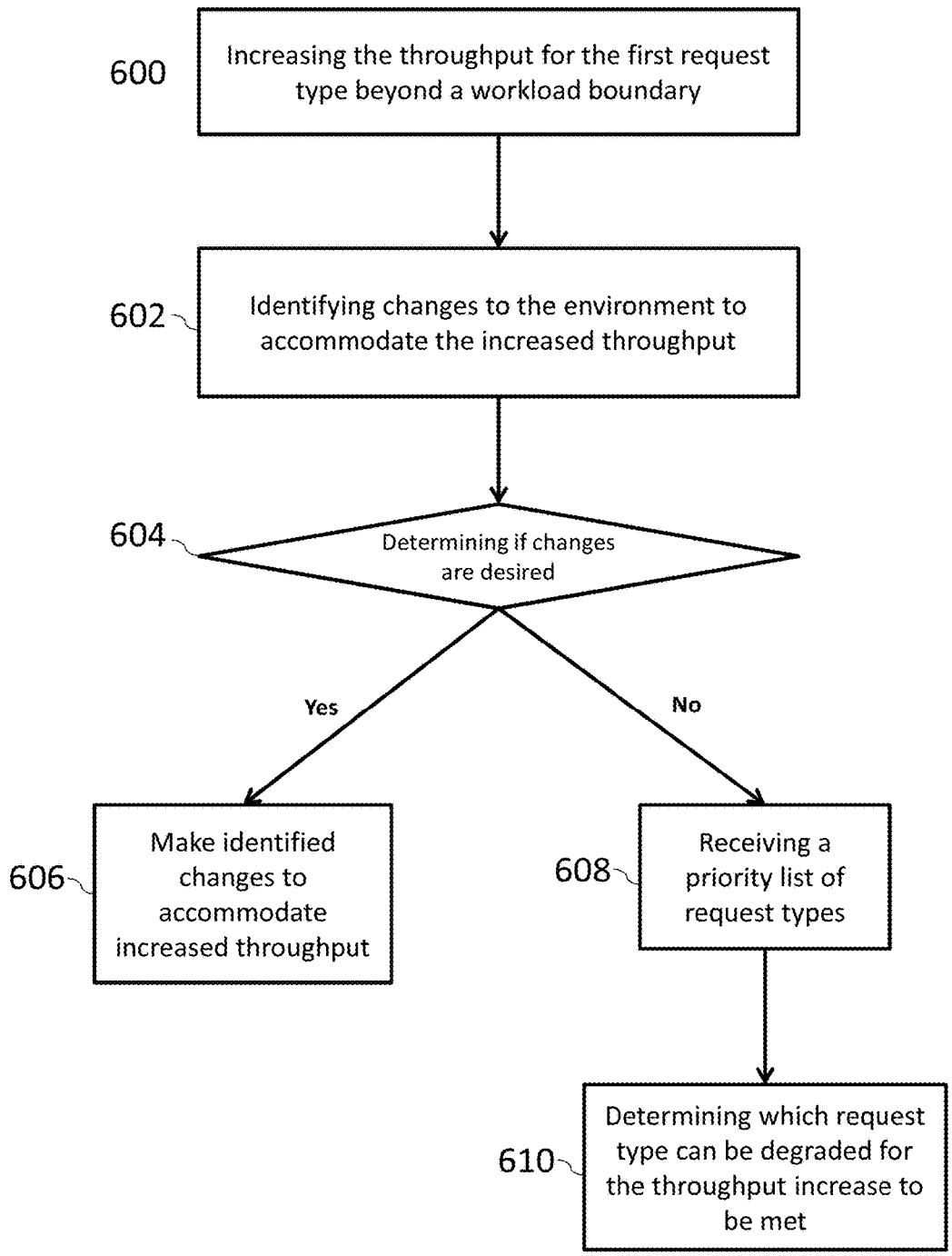
FIG. 6 is a flow chart of a non-limiting illustrative embodiment of a method for expanding software workload boundaries.

Referring now to FIG. 6, there is shown a flowchart of a method for expanding software workload boundaries according to a non-limiting illustrative embodiment. At the first step 600, the throughput for the first request type is increased beyond a workload boundary. To accommodate the increased throughput, the system, at the next step 602, identifies changes that must be made to the environment. First, the system analyzes impact factors in order to determine what needs to be adjusted. Then, the system identifies potential adjustments that can be made based on the determined need. After identifying potential changes, the system, at the next step 604, determines if the changes are desired or not.

If the changes are desired, the system, at the following step 606, makes the required adjustments. However, if the identified potential changes are not desired, the system, at the following step 608, receives a priority list of request types. At the next step 610, the system determines which request type can be degraded to accommodate the throughput increase. Usually, the degraded request type is the least important, or lowest on the priority list. Referring back to FIG. 4 as an example, request type RT1 exceeded the workload mix boundary and the system degraded request type RT2 to run at 10% degradation of its performance requirements.

Figure 8:
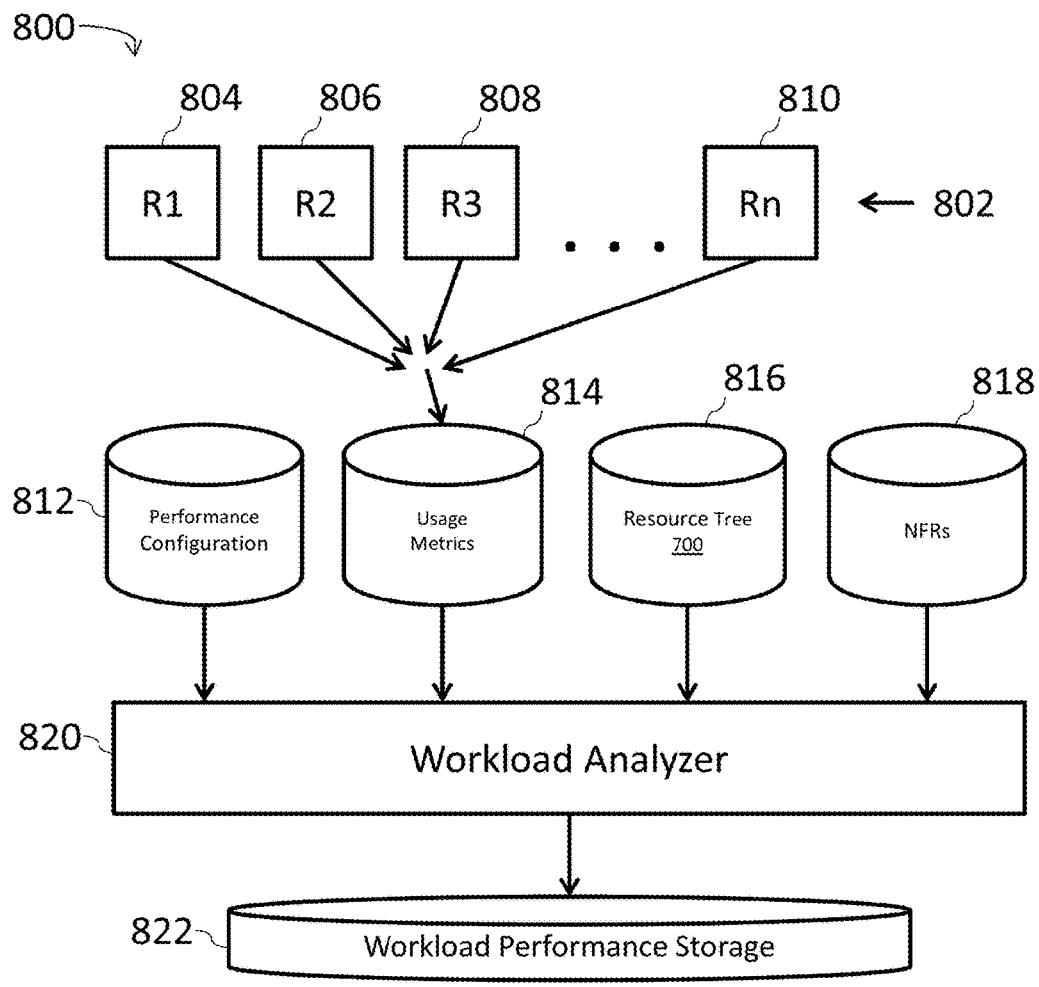
FIG. 8 is a diagram of a non-limiting illustrative embodiment of a system for forecasting and expanding software workload boundaries.

As shown in FIG. 8, block diagram 800 includes: resource middleware layer 802 (including middleware resources 804, 806, 808 and 810); performance configuration storage block 812; usage metric storage block 814; resource tree storage block 816 (including resource tree 700, discussed above)); NFR storage block 818; workload analyzer 820; and workload performance storage block 822.

As shown in block diagram 800: (i) the performance requirements, priority associated with each request type and the acceptable degradation level for the performance requirements are stored (for example, RT1 throughput requirement is 1000 requests per second, but the largest degradation acceptable is 10%, that is, in this example, 900 requests per second is the least throughput acceptable; (ii) for each request type, the sequence of resources required to execute requests of that type is stored; (iii) for each resource required by a request type, all performance configuration information is stored; (iv) usage metrics for each resource at the middleware level required for each request type for various concurrency or throughput levels are collected (for example, web container thread pool usage, JDBC use time, JDBC wait time—this provides the middleware resource consumption percentage for each request type for a given concurrency or throughput level); (v) physical resource usage (CPU, memory, disk, and network) associated with each request type for various concurrency or throughput levels is collected (this provides the physical resource consumption percentage for each request type for a given concurrency or throughput level; (vi) the resources across all layers are ordered starting with the resource that would be constrained first and ending with the resource that would be constrained last if we were to increase the throughput for a given request type (for example, for request type RT1, the memory, which is a physical resource, would be constrained first followed by the web container thread pool which is a middleware resource); and (vii) for each resource in the ordered list in the previous operation, all resources and request types that would be impacted are found.

Some embodiments of the present invention may include one, or more, of the following features, characteristics and/or advantages: (i) determining multiple workload boundaries; (ii) concerned with workload boundaries as dictated with a degradation in response time or throughput; (iii) degradation may, or may not, correspond with a resource contention; (iv) addresses the condition that a workload boundary (singular) is reached; (v) recommends changes to push the workload boundary(ies); and/or (vi) determines what request types can be degraded for the sake of other more important request types.

Some embodiments of the present invention may include one, or more, of the following features, characteristics, operations and/or advantages: (i) determination of workload boundaries (with a workload boundary being defined as the maximum throughput reached for a given request type in an environment serving multiple different request types without jeopardizing any throughput or response time service level agreement for any request type served by the environment; there are multiple workload boundaries because there are typically different request types served in an environment); (ii) determination of workload boundaries as dictated with a degradation in response time or throughput (this degradation may or may not correspond with a resource contention); (iii) if a workload boundary (singular) is reached, determining recommended changes to push the workload boundary; (iv) if a workload boundary (singular) is reached, determination of which request types can be degraded for the sake of other more important request types; (v) receiving a resource tree data set that includes machine readable data identifying a plurality of resources in a resource tree; (vi) for each request type of a plurality of request types including a first request type, receiving a historical usage information set that includes machine readable data indicative of actual resource usage for the respectively corresponding request type with respect to the plurality of resources in the resource tree; (vii) for each request type of the plurality of request types, receiving a sequence information set that includes machine readable data indicative of an order of resources of the resource tree used for the respectively corresponding request type; (viii) for each request type of the plurality of request types, receiving a current throughput value for the respectively corresponding request type; (ix) determining, based at least in part upon the resource data tree set, the sequence information set and the current throughput values, a first additional potential throughput value corresponding to additional throughput with respect to requests of the first request type that can be performed by the resource tree in addition to its current throughput; (x) embodiments where the resource tree spans across multiple solution layers; (xi) receiving a current performance requirement value, where the determination of the first additional potential throughput is further based on the current performance requirement value; (xii) changing a current performance requirement value corresponding to a second request type of the plurality of request types; and/or (xiii) determining, based at least in part upon the resource data tree set, the sequence information set, the current throughput values and the current performance requirement values, a second additional potential throughput value corresponding to additional throughput with respect to requests of the first request type that can be performed by the resource tree in addition to its current throughput.

In some embodiments of the present invention, a method, system (including a processor(s) set, storage device and computer code) and/or computer program product (storage device and computer code) for performing the following operations (not necessarily in the following order: (i) receiving a workload distribution data set that includes information indicative of: (a) a plurality of request types including a first request type and a second request type, (b) proportional distribution of total workload among and between the request types of the plurality of request types, (c) initial maximum throughput values respectively corresponding to each request type of the plurality of request types, and (d) initial actual throughput values respectively corresponding to each request type of the plurality of request types; (ii) determining that an actual throughput value for the first request type has increased from the initial actual throughput value to an increased actual throughput value; and (iii) responsive to the determination of the increase in actual throughput value for the first request type: (a) decreasing the maximum throughput value corresponding to the second request type from the initial maximum throughput value to a decreased maximum throughput value, and (b) increasing the maximum throughput value corresponding to the first request type from the initial maximum throughput value to an increased maximum throughput value.

In some embodiments of the present invention, a method, system (including a processor(s) set, storage device and computer code) and/or computer program product (storage device and computer code) for performing the following operations (not necessarily in the following order: (i) receiving a first request type data set that includes information indicative of: (a) an initial maximum throughput value respectively corresponding to a first request type of a plurality of request types, (b) an initial actual throughput value corresponding to the first request type, (b) an initial maximum response time value corresponding to the first request type, and (d) an initial actual response value corresponding to the first request type; (ii) determining that an actual throughput value for the first request type has increased from the initial actual throughput value to an increased actual throughput value; and (iii) responsive to the determination of the increase in actual throughput value for the first request type: (a) increasing the maximum response time value corresponding to the first request type from the initial maximum throughput value to an increased maximum response time value, and (b) increasing the maximum throughput value corresponding to the first request type from the initial maximum throughput value to an increased maximum throughput value.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A computer processing system comprising:
 a computer processor having a non-transitory memory containing program code for:
  receiving a resource tree data set that includes machine readable data identifying a plurality of resources in a resource tree;
  for each request type of the plurality of request types, receiving a sequence information set that includes machine readable data indicative of an order of resources of the resource tree used for the respectively corresponding request type;
  for each request type of a plurality of request types including a first request type, receiving a historical usage information set that includes machine readable data indicative of actual resource usage for the respectively corresponding request type with respect to the plurality of resources in the resource tree;
  for each request type of the plurality of request types, receiving a current throughput value for the respectively corresponding request type; and
  determining, based at least in part upon the resource data tree set, the sequence information set and the current throughput values, a first additional potential throughput value corresponding to additional throughput with respect to requests of the first request type that can be performed by the resource tree in addition to its current throughput.

2. The system of claim 1, further comprising program code for:
 for each request type of the plurality of request types, receiving a current response time value for the respectively corresponding request type;
 wherein the determination of the first additional potential throughput is further based on the current response time values.

3. The system of claim 1, further comprising program code for:
 for each request type of the plurality of request types, receiving a performance requirement value for the respectively corresponding request type;
 wherein the determination of the first additional potential throughput is further based on the performance requirement values of all of the plurality of request types.

4. The system of claim 1, wherein the resource tree spans across multiple solution layers.

5. The system of claim 4, further comprising program code for:
for each request type of the plurality of request types, receiving a physical resource usage value for resources in each solution layer for the respectively corresponding request type;
wherein the determination of the first additional potential throughput is further based on the physical resource usage values.

6. The system of claim 3, further comprising program code for:
changing a performance requirement value corresponding to a second request type of the plurality of request types; and
determining, based at least in part upon the resource data tree set, the sequence information set, the current throughput values and the performance requirement values, a second additional potential throughput value corresponding to additional throughput with respect to requests of the first request type that can be performed by the resource tree in addition to its current throughput.

7. The system of claim 6, wherein the performance requirement value is a required throughput value.

8. The system of claim 6, wherein the performance requirement value is a required response time value.

9. The system of claim 6, further comprising program code for:
changing a physical resource usage value for resources in each solution layer corresponding to a second request type of the plurality of request types; and
determining, based at least in part upon the resource data tree set, the sequence information set, the current throughput values and the current response time values, a second additional potential throughput value corresponding to additional throughput with respect to requests of the first request type that can be performed by the resource tree in addition to its current throughput.

10. A method for forecasting and expanding software workload boundaries, comprising the steps of:
receiving a resource tree data set that includes machine readable data identifying a plurality of resources in a resource tree;
for each request type of the plurality of request types, receiving a sequence information set that includes machine readable data indicative of an order of resources of the resource tree used for the respectively corresponding request type;
for each request type of a plurality of request types including a first request type, receiving a historical usage information set that includes machine readable data indicative of actual resource usage for the respectively corresponding request type with respect to the plurality of resources in the resource tree;
for each request type of the plurality of request types, receiving a current throughput value for the respectively corresponding request type; and
determining, based at least in part upon the resource data tree set, the sequence information set and the current throughput values, a first additional potential throughput value corresponding to additional throughput with respect to requests of the first request type that can be performed by the resource tree in addition to its current throughput.

11. The method of claim 10, wherein the resource tree spans across multiple solution layers.

12. The method of claim 10, further comprising the steps of:
for each request type of the plurality of request types, receiving impact information for the respectively corresponding request type;
wherein the determination of the first additional potential throughput is further based on the impact information.

13. The method of claim 11, wherein the impact information set comprises a physical resource usage value for resources in each solution layer for the respectively corresponding request type.

14. The method of claim 11, wherein the impact information set comprises a current response time value for the respectively corresponding request type.

15. The method of claim 11, wherein the impact information set comprises a performance requirement value for the respectively corresponding request type.

16. The method of claim 11, further comprising the steps of:
changing a performance requirement value corresponding to a second request type of the plurality of request types; and
determining, based at least in part upon the resource data tree set, the sequence information set, the current throughput values and the performance requirement values, a second additional potential throughput value corresponding to additional throughput with respect to requests of the first request type that can be performed by the resource tree in addition to its current throughput.

17. The system of claim 16, wherein the performance requirement value is a required throughput value.

18. The system of claim 16, wherein the performance requirement value is a required response time value.

19. The method of claim 16, further comprising the step of:
for each request type, identifying which type impact information needs to be changed.

20. The method of claim 16, further comprising the step of:
listing at least the first request type and second request type in a priority order; and
degrading a request type based on the priority order of request types.

* * * * *